(12) United States Patent
Asthana et al.

(10) Patent No.: US 7,886,001 B2
(45) Date of Patent: Feb. 8, 2011

(54) METHOD AND APPARATUS FOR CONTROLLING ACTIONS BASED ON TRIGGERS IN A CONFERENCE

(75) Inventors: Aseem Asthana, San Jose, CA (US); Ashish Chotai, Santa Clara, CA (US); Sravan Vadlakonda, Sunnyvale, CA (US); Shantanu Sarkar, San Jose, CA (US); Randall Baird, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 660 days.

(21) Appl. No.: 11/318,120

(22) Filed: Dec. 23, 2005

(65) Prior Publication Data

US 2007/0150583 A1 Jun. 28, 2007

(51) Int. Cl.
*G06F 13/00* (2006.01)
(52) U.S. Cl. .................. 709/204; 709/205; 709/206; 709/207
(58) Field of Classification Search .......... 709/204, 709/205, 206, 207
See application file for complete search history.

(56) References Cited

U.S. PATENT DOCUMENTS

| | | | |
|---|---|---|---|
| 6,778,822 B1 * | 8/2004 | Visser et al. ............. | 455/422.1 |
| 6,807,563 B1 * | 10/2004 | Christofferson et al. ..... | 709/204 |
| 6,876,734 B1 | 4/2005 | Summers et al. | |
| 7,027,577 B2 * | 4/2006 | Gourraud et al. ....... | 379/202.01 |
| 7,085,244 B2 * | 8/2006 | Koskelainen et al. ........ | 370/261 |
| 7,151,753 B2 * | 12/2006 | Chaney et al. ............. | 370/261 |
| 7,257,090 B2 * | 8/2007 | Seavers et al. ............. | 370/260 |
| 7,308,476 B2 * | 12/2007 | Mannaru et al. ............ | 709/204 |
| 7,328,239 B1 * | 2/2008 | Berberian et al. .......... | 709/204 |
| 7,379,968 B2 * | 5/2008 | Schuh ........................ | 709/204 |
| 7,412,392 B1 * | 8/2008 | Satapathy ................ | 704/270.1 |
| 7,546,301 B1 * | 6/2009 | Balachandran ............... | 705/26 |

OTHER PUBLICATIONS

Cisco Systems, Inc., "Cisco Meetingplace 5.3", Copyright © 1992-2004, 14 pages.

* cited by examiner

*Primary Examiner*—Rupal D Dharia
*Assistant Examiner*—Van Kim T Nguyen
(74) *Attorney, Agent, or Firm*—Fish & Richardson P.C.

(57) ABSTRACT

Disclosed are conferencing systems, devices, architectures, and methods for implementing a trigger-based conferencing system to facilitate increased productivity meeting participation. An exemplary method, in accordance with embodiments, of managing a workflow application in a conference, where the conference includes a plurality of events, can include: (i) creating a trigger by defining a predicate and action for the trigger; (ii) registering the trigger to at least one of a plurality of detection points; (iii) evaluating the trigger's predicate each time any of the detection points against which it is registered are encountered; and (iv) executing actions associated with the trigger if the predicate evaluation is positive, where execution of the actions can result in a state change in the conference.

18 Claims, 4 Drawing Sheets

METHOD AND APPARATUS FOR CONTROLLING ACTIONS BASED ON TRIGGERS IN A CONFERENCE

BACKGROUND OF THE INVENTION

This invention is related in general to conferencing systems and more specifically to devices, systems, architectures, and methods for using triggers to control workflow applications in conferences.

A typical meeting or conference may cover a large amount of content and a participant's presence may only be required for some portion of that content discussion, as opposed to the entire meeting. Such content can be a presentation format, a text document, or a media file, for example. In some conferences, the participant's presence may be required for only some categories of content. For example, sales people may only wish to attend a portion of the meeting involving a sales presentation. In other situations, a participant may only like to be present in the meeting for certain sections of the content being discussed. For example, in a slide presentation covering multiple sections, the participant may only be interested in a few of the presented slides. In another case, some contents of a meeting may be confidential such that those materials cannot be disclosed to anyone except those on an approved list.

Some conventional approaches include "camp-on" based on a conference agenda, quorum, key participants available, cell phone availability, and telephony applications (e.g., where the other end of a line is busy). However, these approaches do not address the productivity problems generally associated with having uninterested meeting participants due to the content of the meeting. In particular, such approaches may only facilitate camping-on based on timeslots, but not meeting content and/or variable meeting flow. Further, such approaches are not easily customizable or dynamically changeable to accommodate different situations. Accordingly, what is needed is a way of using "triggers" in a conference setting to control workflow applications.

DETAILED DESCRIPTION OF EMBODIMENTS OF THE INVENTION

Embodiments of the present invention implement conferencing systems, devices, architectures, and/or methods for a trigger-based conferencing system to facilitate increased productivity meeting participation.

A "trigger" may refer to a procedure that can be dynamically inserted at a well-defined event in a rich media conferencing system. Such an event may be referred to as a "detection point." Further, detection points may generally be state-based, event-based, and/or transition-based. Each trigger may include a "predicate" and an associated "action." A predicate may be a conditional expression that can be evaluated each time the detection point is reached. If the predicate evaluation yields a negative result, conference processing may continue uninterrupted. On the other hand, if the predicate evaluation yields a positive result, conference processing can be modified in response to execute any action associated with that trigger. Such actions may include one or more well-defined operations recognized by the conference system.

An exemplary method, in accordance with embodiments, of managing a workflow application in a conference, where the conference includes a plurality of events, can include: (i) creating a trigger by defining a predicate and action for the trigger; (ii) registering the trigger to at least one of a plurality of detection points; (iii) evaluating the trigger's predicate each time any of the detection points against which it is registered are encountered; and (iv) executing actions associated with the trigger if the predicate evaluation is positive, where execution of the actions can result in a state change in the conference.

Various approaches in accordance with embodiments may define a set of detection points differently, such as may be based on event types available to a specific conferencing system. Accordingly, various such embodiments may implement the creation and registration of triggers differently, based on an associated implementation of the conferencing system. Various such embodiments may also define differing criteria for the evaluation of trigger predicates. For example, the criteria may be based on what is available for evaluation in the conferencing system, the complexity level deemed appropriate for the predicates, and/or the computational resources required by evaluation of the predicates. Various such embodiments may also define different sets of actions from which to choose when a trigger predicate evaluates positively. For example, these actions may be based on available features implemented by the conferencing system, the complexity level deemed appropriate for the actions, and/or the computational resources required for execution of the actions.

Advantages of embodiments of the present invention can include: (i) greater control by a user and/or a moderator in a conference by allowing for the relatively easy injection of triggers and customized workflow; (ii) highly flexible conference proceedings by allowing users to be notified via workflows in response to content-based triggers; (iii) increased security and control associated with managing confidential content in a meeting; (iv) facilitation of the revisiting of certain parts and/or sections of contents in order to "re-fire" associated triggers; and (v) overall increased conference productivity.

In accordance with embodiments, "rich" media or a full selection of media types (e.g., more than just audio and video media modes or components, but rather audio, video, text messaging, web-based application sharing, etc.) can be supported. Further, in general, any type of hardware, software or combination thereof can be used with aspects of embodiments of the invention. Also, any type of network and/or communication link can be used.

For clarity, various well-known components, such as power supplies, some or portions of communications ports, routers, gateways, firewalls, and so on, have been omitted from the figures. However, those skilled in the art with access to the present teachings will know which components to implement and how to implement them to meet the needs of a given application.

In accordance with embodiments of the present invention, detection points can be based on application content (e.g., a slide presentation or any such event) in a conference. Such detection points can be preconfigured and/or added during the course of the conference (e.g., by a user or moderator). As such, detection points may be based on anticipated meeting topics (because a conference generally includes a well-defined set of events) or the detection points may be based on a request made by a conference user or participant, for example. Further, detection points can be agenda-based and/or linked to documents or presentations to be shared during the conference. A detection point can also be a specific location within a document, such as a particular slide in a slide presentation.

According to embodiments of the present invention, a user can "camp-on" or post a subscription (e.g., set a trigger) for some event (e.g., reaching a detection point or such condition) in a conference. In turn, the requesting user or an affected other user (e.g., a prospective conference participant) can receive some "action" in response. Accordingly, each such detection point can have a conference-related "workflow" or a sequence of actions registered therewith. The sequence of actions associated with a particular trigger registered with the detection point may then be executed when the flow of the meeting (e.g., meeting content or event) reaches that detection point and evaluation of the trigger's predicate is positive.

In another aspect of embodiments of the present invention, action execution may by initiated using "moderator intervention." Such moderator intervention may be implemented by registering an appropriate trigger against a moderator intervention detection point (e.g., set using a graphical user interface (GUI)), for example. Generally, similar to other triggers in accordance with embodiments, actions registered against moderator intervention detection points may be automatically executed when, for example, the content containing the appropriate detection point is reached or invoked and the predicate is positively evaluated. In addition, a manual override function can also be included whereby a particular trigger is fired in response to the override (e.g., not necessarily encountered within a normal conference flow). Such a manual override may be useful for testing or emergency situations, for example.

Triggers in accordance with embodiments can be set in any number of ways. For example, in web-based conferencing, a trigger can be set by filling out a hyper-text markup language (HTML) form. An audio-only endpoint (e.g., a particular conference room) may use telephony user interface (TUI) to set the trigger. An associated detection point of such a trigger can be represented in the form of an extensible markup language (XML) tag carried by an appropriate control protocol message (e.g., a session initiation protocol (SIP) format), for example.

In one embodiment of the present invention, a participant can request notification or some other action based on content being shared in a conference. For example, the content may be a presentation document, a text editor document, or a media-player application. Once the desired content is shared or encountered during the course of a conference, the prospective participant can be notified and that new participant can then join the conference, for example.

Figure 1:
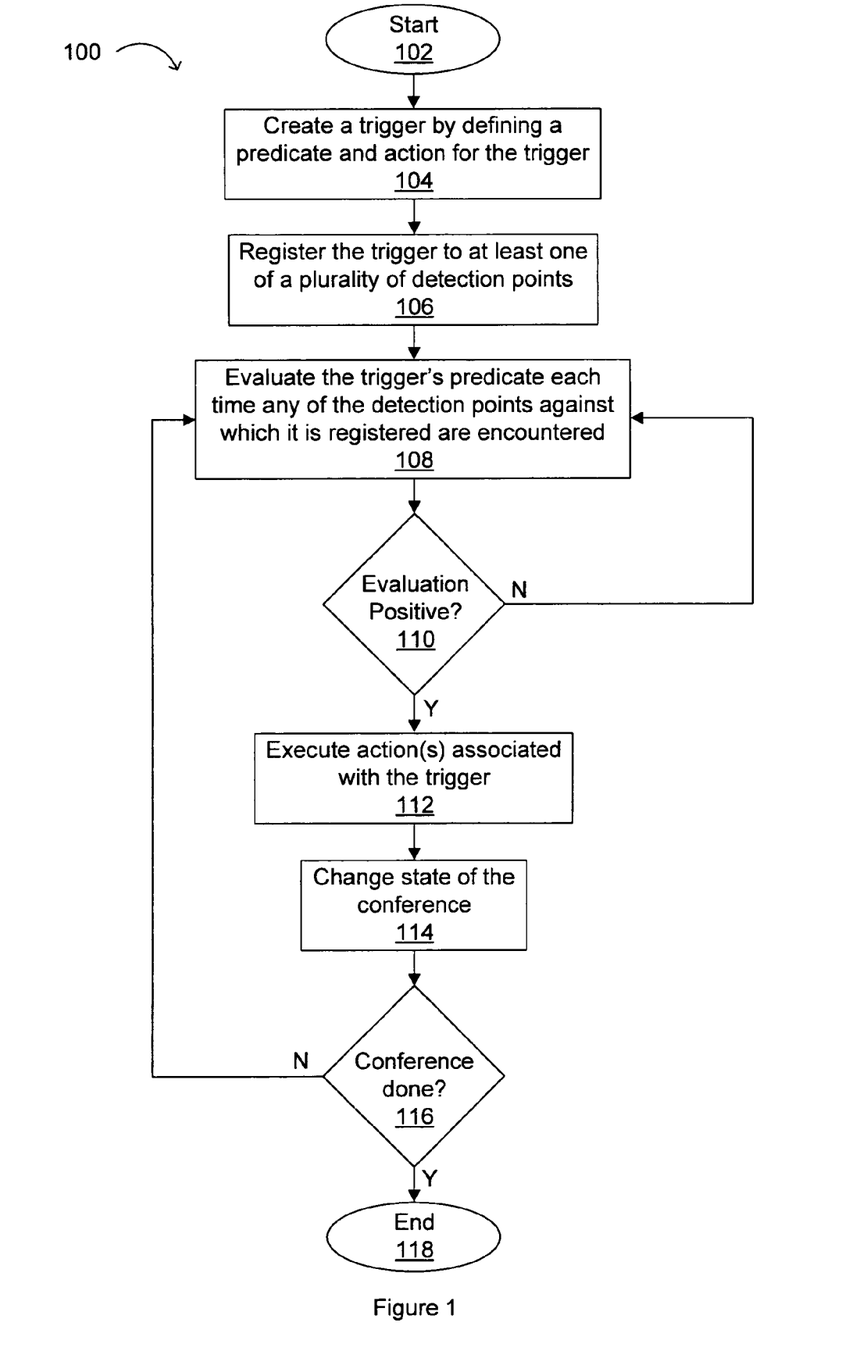
FIG. 1 is a block diagram illustrating an exemplary method of managing a workflow application in a conference in accordance with embodiments of the present invention.

Referring now to FIG. 1, a block diagram illustrating an exemplary method of managing a workflow application in a conference in accordance with embodiments of the present invention is indicated by the general reference character 100. The flow can begin (102) and a trigger can be created by defining a predicate and action for the trigger (104). The trigger can then be registered to at least one of a plurality of detection points (106). The trigger's predicate can be evaluated each time any of the detection points against which it is registered are encountered (108). For example, each time a slide is changed, for an event-based detection point, the trigger's predicate can be evaluated. If the predicate evaluation is negative (110), the flow can return to step 108 to await (e.g., within the normal conference flow) for encountering of the next detection point. On the other hand, if the predicate evaluation is positive (110), any actions associated with the trigger can be executed (112). Execution of these actions can result in a state change in the conference (114). If the conference is done (116), the flow can complete (118). However, if the conference is ongoing, the flow can return to step 108 to continue to await an encounter with another detection point.

Table 1 below shows exemplary code representing a conference trigger operation for event-based detection points in accordance with embodiments of the present invention.

TABLE 1

```
conference service starts;
while (conference service still up) {
    receive event;
    process event;
    if (event==trigger registration) {
        add trigger to specified detection point;
    } else if (event causes a detection point to be encountered) {
        if (triggers registered on detection point) {
            for (each trigger) {
                evaluate trigger predicate;
                if (trigger's predicate == true) {
                    execute associated actions;
                {
            {
        }
    }
}
end conference service;
```

Figure 2:
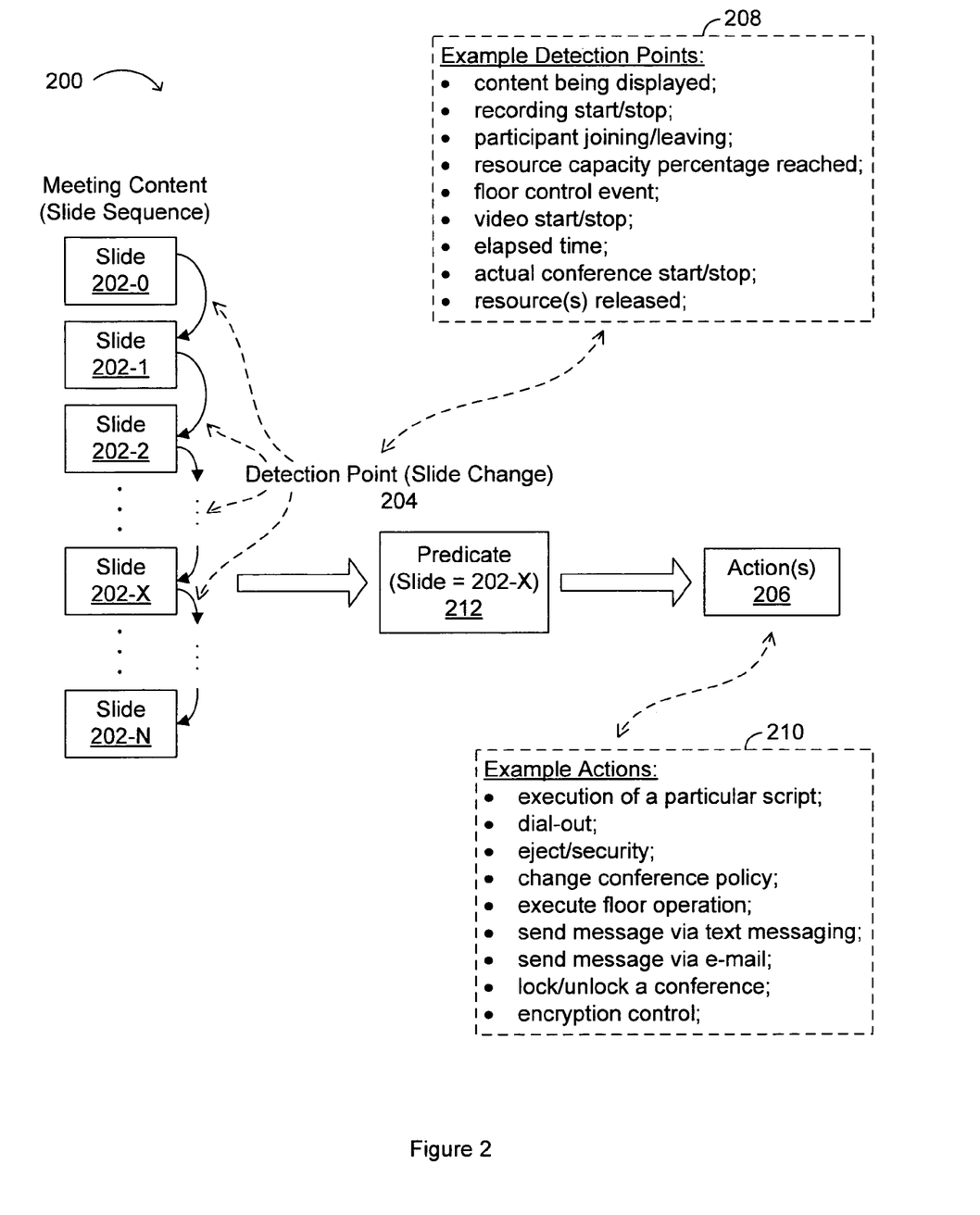
FIG. 2 is a block diagram illustrating an exemplary trigger operation based on a conference slide presentation in accordance with embodiments of the present invention.

Referring now to FIG. 2, a block diagram illustrating an exemplary trigger operation based on a conference slide presentation in accordance with embodiments of the present invention is indicated by the general reference character 200. Prior to such a meeting, the documents and/or content being shared in the conference (e.g., presentation slides) can be listed by the moderator in a predefined "conference content" template. A user can indicate the content on which the user would like to place a trigger. This trigger may be registered against a detection point. Further, the trigger can include a predicate for evaluation and a corresponding action that can be "registered" by the conference application. Such an action may be, for example, a dial-out operation where a participant may be dialed directly and asked to enter the conference immediately once that content is shared (i.e., the detection point is encountered) and the associated predicate is evaluated positively during the course of the conference.

In the particular example of FIG. 2, meeting content can include a sequence of slides: 202-0, 202-1, 202-2, . . . , 202-X, . . . , through 202-N. Detection point 204 can be a change in the slides such that each time a slide is changed during the course of the meeting, this detection point is "encountered." A trigger registered against detection point 204 can include predicate 212 and one or more actions 206. In this particular example, predicate 212 can include "Slide=202-X" such that a positive predicate evaluation may occur when slide 202-X is displayed during the meeting. Of course, detection points can generally be state-based, event-based, and/or transition-based. In this particular example, a detection point may be encountered upon each change in slides (e.g., detection point 204), but any other suitable detection points may be used in accordance with embodiments of the present invention.

In order to implement a slide presentation approach in accordance with embodiments of the present invention, slides may first be converted into slide objects (not shown in FIG. 2) and then a trigger can be registered against a "content changed" type of detection point, for example. Generally, a user can load slides into such a conference either at runtime or ahead of time. Once a slide is encountered during the meeting, the predicate (e.g., Content ID="Sales Forecast") can be evaluated. If that predicate is evaluated positively (e.g., the Content ID is the sales forecast, so that particular slide of interest has been encountered), one or more associated actions (e.g., actions 206) can be executed in response.

Example detection points (e.g., events) 208 can include: (i) content being displayed; (ii) starting or stopping recording of the conference; (iii) participant joining/leaving the conference; (iv) resource capacity percentage reached; (v) floor control event (e.g., close the floor to comments so that only the lecturer can speak, open the floor to comments or questions, promote a particular questioner to have the right to speak, bring the conference into session, or queue a request from a participant); (vi) video start/stop; (vii) elapsed meeting time; (viii) actual conference start/stop; (ix) resources being released by the conference (e.g., where have been in a conference for a while and no one else is going to join, can release any unused resources); (x) moderator intervening in the conference; (xi) an application being shared among participants; (xii) a conference breakout session being created or destroyed; (xiii) a conference being brought into session; (xiv) a participant moving to a breakout session or rejoining a main conference; and/or (xv) a conference being scheduled with the conferencing system.

Example actions 210 can include: (i) execution of a particular script (e.g., executing a sequence of actions based on a trigger); (ii) dial-out (e.g., to call a prospective conference participant directly from the conference); (iii) eject a participant; (iv) change conference policy (e.g., allow/disallow video or change security attributes); (v) execute a floor operation (e.g., open/close the floor, bring the conference into session, or grant a questioner the right to speak); (vi) send a message via text messaging; (vii) send a message via e-mail; (viii) lock/unlock a conference (e.g., disallow anyone else from joining the conference or allow anyone to join); (ix) controlling an enabling of an encryption; (x) bringing the conference into session; (xi) polling participants; (xii) creating or destroying a breakout session; (xiii) displaying a specific piece of content; (xiv) muting some or all of the participants; and/or (xv) executing an interactive voice response script for one or more participants.

Further examples of conference events or content suitable for tagging as detection points (e.g., may be set in a system and/or set by a moderator or participant) can include: (i) a user may want to join a conference only when a certain application and/or content is shared; (ii) a user may be interested in attending a conference only when a discussion involving interesting and/or required content occurs; and (iii) the system can decide to bar all participants except privileged participants, based on the content of the conference. Other applications of embodiments of the present invention include law enforcement or emergency response type systems.

As discussed above, a user can decide to place a detection point within the contents of a conference, rather than related to the entire content itself. A moderator can define such triggers that can be "fired" or encountered during the course of a meeting. For example, such triggers may be fired by the moderator after each topic/discussion, or perhaps after every subsection in a document that is being discussed in the meeting. When a requested user dials-in to the conference (or earlier), that user can view the topics of interest to that user, the user can elect to be notified in response to one or more topics being raised at some detection point, then the user can drop-out (at least temporarily) of the meeting. In this fashion, a meeting "participant" does not have to attend the entire meeting when only a few content areas or portions are of interest.

A moderator can fire such triggers indirectly by way of moderator intervention, as discussed above. Such moderator intervention may be implemented by registering an appropriate trigger against a moderator intervention detection point. Further, a manual override mode whereby a moderator can manually fire triggers may also be included in accordance with embodiments of the present invention. Typically, however, an automated approach can be used once the detection points are reached (e.g., including automatic predicate evaluation). This automated approach may be particularly useful when the content is a document and it is relatively large, perhaps spanning multiple sections and/or multiple disciplines. For example, the document being shared in a particular meeting may involve an engineering team being present for a portion of the meeting, a marketing team for another portion, and a finance team for yet another portion. Each such portion can correspond to one or more sections of the same document. In such situations, a user may request notification based on a trigger registered to a given section of the document (e.g., a detection point), in accordance with embodiments. Then, whenever the relevant section is discussed or encountered in the meeting (thus, the predicate has been evaluated positively), the prospective meeting participant or user can be notified.

Figure 3:
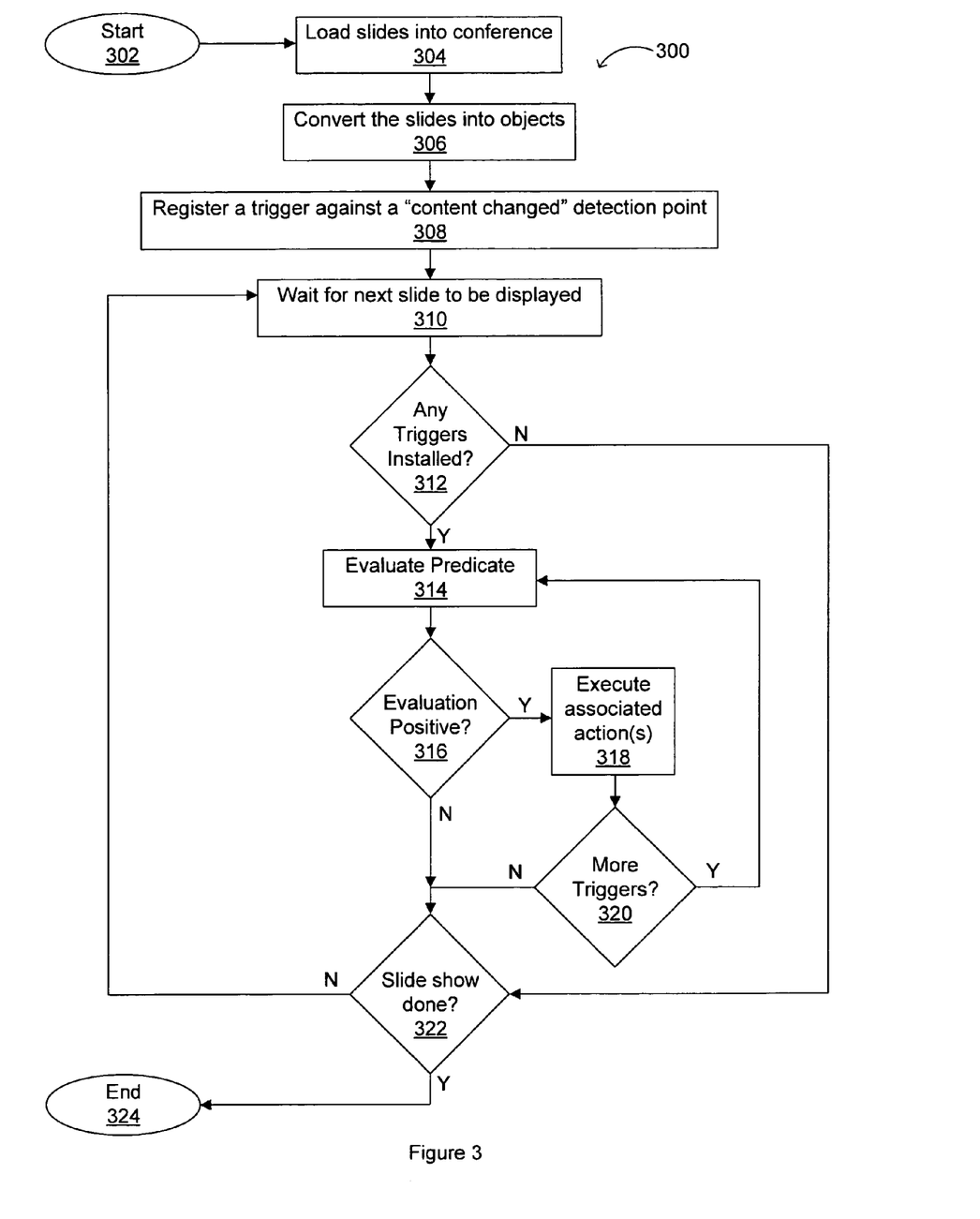
FIG. 3 is a flow diagram illustrating an exemplary conference trigger method in accordance with embodiments of the present invention.

Referring now to FIG. 3, a flow diagram illustrating an exemplary conference trigger method in accordance with embodiments of the present invention is indicated by the general reference character 300. The flow can begin (302) and slides can be loaded into a conference server (304). The slides can then be converted into objects (306) and triggers can be registered against a "content changed" detection point (308). During the conference, a slide (or associated slide object) can be displayed (310). Further, "content changed" detection points can be entered in box 310, once the slide content has changed. If there are no triggers installed (i.e., nothing registered against that detection point) (312), and if the slide show is done (322), the flow can complete (324). If the slide show is not done (322), the trigger system will become idle until the next slide can be displayed (310). If there is a trigger installed (312), its predicate can be evaluated (314).

Once a detection point is reached, the predicates of any corresponding triggers can be evaluated (314). If the predicate is evaluated negatively (316), an associated trigger will not be fired and the conference system must proceed to check whether the slide was the last in the conference (322). On the other hand, if the predicate is evaluated positively (316), the associated actions can be executed (318). Such actions may change a state of the conference. If there are more triggers (320) registered against this detection point or slide being displayed, another predicate can be evaluated (314). This loop (e.g., 314, 316, 318, and 320) can continue until all triggers have been exhausted. Once the action(s) registered with the encountered detection point is performed (318) due to the positive predicate evaluation, if there are no more triggers (320), and if the slide show is done (322), the flow can complete (324). If the slide show is not done (322), a next slide in the conference can be shown (310). As discussed above, a participant or conference moderator may also choose to add new triggers during the course of the conference, for example. This can be useful where a particular user has previously made a request for additional triggers during the course of the meeting, for example.

As discussed above, triggers can be set by tagging or registering detection points in appropriate sections in a document, in accordance with embodiments of the present invention. In one such approach, for example, an HTML reference can be inserted in an appropriate location for tagging. Clicking on the resulting universal resource locator (URL) can result in an executable being initiated that can then result in a prospective conference participant being notified, for example. This "clicking" can be done automatically or directly by the moderator, for example. The HTML reference can be associated with actual meeting context (e.g., "Contact Bob at (telephone number)"). Many modern document editing software tools can allow for the insertion of such HTML references. For example, "ActiveX" control can be utilized for applying such detection points with Microsoft documents (e.g., perhaps via a dynamic link library (DLL) or the like).

In another aspect of embodiments of the present invention, a system can share (or not share) contents based on the profiles of participants currently in the conference. In this approach, the conferencing system can verify that each participant currently in the conference is in fact allowed to view a particular document or to participate in a certain agenda item. For example, a document may contain sections that are confidential and can only be shared with select limited participants. Such a document can be tagged to indicate that only designated people meeting the associated confidentiality criteria may be able to participate (e.g., view the document) in the conference for the portions involving this particular document, or designated portions or sections thereof. Upon encountering a detection point and predicate indicating entry into the confidential section of the document, for example, actions could be taken to eject any unauthorized participants from the conference, and then to lock the conference so no additional participants could attend.

In another situation, a topic can be discussed in a conference whereby only certain participants may be given clearance to participate in the discussion (e.g., feedback on a job candidate's interview). In this case, the moderator can ensure that only any required participants are in the conference at this particular time. For example, if a new participant attempts to join the conference at this time, the system can allow conference joining only if this new participant has the appropriate privileges to view the document and/or content being discussed. If this new participant does not possess the appropriate privileges, the system may deny this new participant access and/or display a message and out-dial the prospective participant once the restricted content topic discussion has been completed.

When conference rooms are used, but groups of participants are physically present in different conference rooms (e.g., in a distributed video conference), the conference server can use interactive voice response (IVR) or a captioning mechanism to read-out a roster of names required for some particular content. The conference server may also stipulate that such participants are the only ones allowed to be present in a conference room at a given time, such that any other participants may be required to leave the conference room. Such an approach can be utilized for obtaining a required set of participants, as well as a restricted number of participants, for example.

Figure 4:
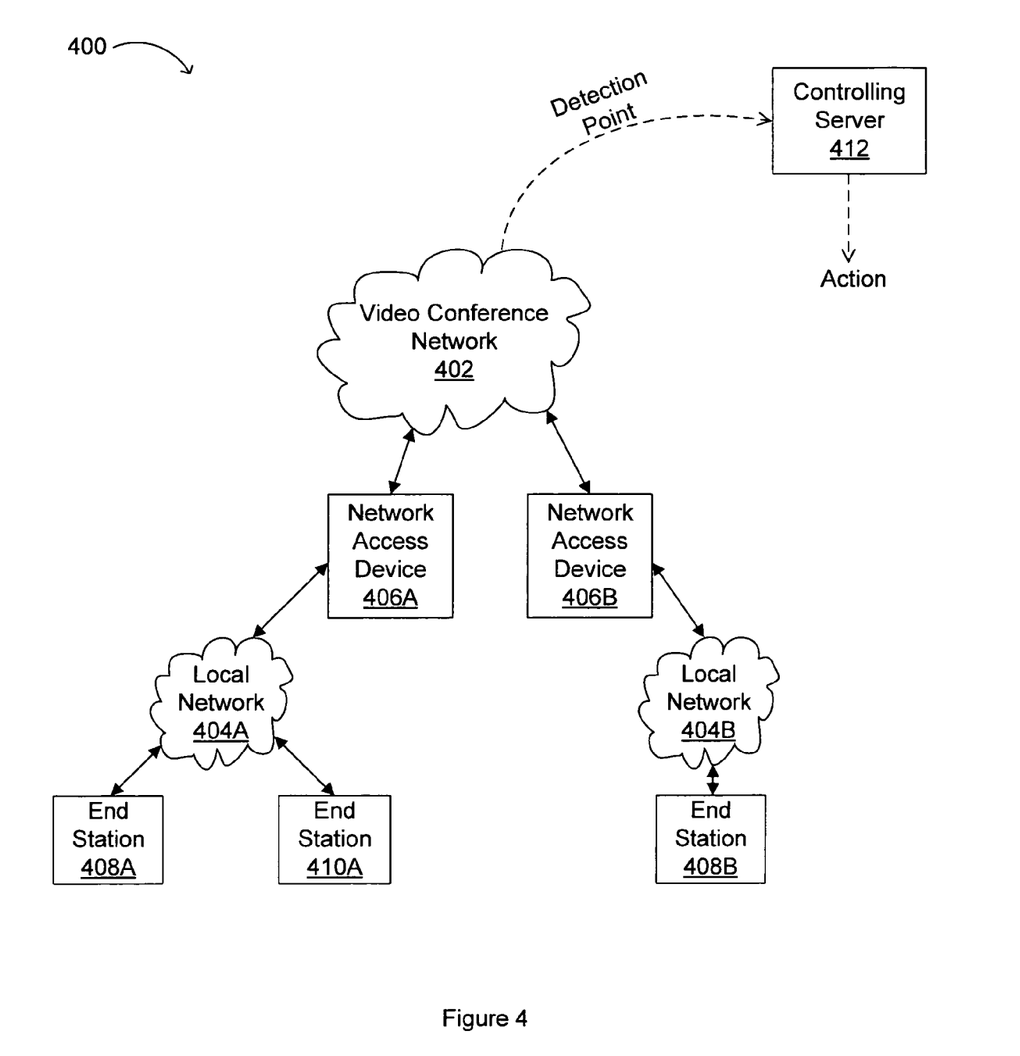
FIG. 4 is a block diagram illustrating an exemplary rich media conference arrangement in accordance with embodiments of the present invention.

Referring now to FIG. 4, a block diagram illustrating an exemplary rich media conference arrangement in accordance with embodiments of the present invention is indicated by the general reference character 400. Rich media conference network 402 can interface with network access devices 406A and 406B. Local network 404A can have end stations 408A and 410A coupled thereto such that end stations 408A and 410A can interface with video conference network 402 via network access device 406A. Similarly, local network 404B can have end station 408B coupled thereto such that end stations 408B can interface with video conference network 402 via network access device 406B. End stations 408A, 410A, and 408B can be located in branch offices, for example. Controlling server 412, which may be multiple servers in some embodiments, may be located in a main office or one or more of the branch offices, for example.

Controlling server 412 may be used to set up of the video conference structure, participant locations, and the like. Controlling server 412 can also include registration and management of triggers (e.g., component actions and predicate information, as well as the associated detection points). Alternatively, some other type of server application (e.g., including a GUI or other suitable user interface) could be used in accordance with embodiments. When a particular detection point is encountered during the course of a conference, if the associated predicate evaluation is positive, initiation of a corresponding action (e.g., registered in controlling server 412) can result.

While examples of particular slide show presentations having triggers have been shown, the concepts discussed herein can be used in many other applications in accordance with embodiments. Generally, embodiments of the present invention can be used to increase meeting productivity by accommodating workflow application or action initiation by using triggers. Such an approach in accordance with embodiments of the present invention can allow for meeting participants to effectively use their meeting time. Further, algorithms and/or methods in accordance with embodiments may also be used in security and emergency management applications, for example.

Accordingly, embodiments of the present invention pertain to the use of triggers to facilitate effective participation in conferences. Advantages of embodiments of the present invention can include: (i) greater control by a user and/or a moderator in a conference by allowing for the relatively easy injection of triggers and customized workflow; (ii) highly flexible conference proceedings by allowing users to be notified via workflows in response to content-based triggers; (iii) increased security and control associated with managing confidential content in a meeting; (iv) facilitation of the revisiting of certain parts and/or sections of contents in order to re-fire associated triggers; and (v) overall increased conference productivity.

While embodiments herein have been discussed with reference to certain types of media conferencing (e.g., video conferencing), embodiments of the present invention are not limited thereto. For example, many other types of media and associated interchange or communication may be used in accordance with embodiments of the present invention. Further, specific network arrangements and configurations shown herein are merely exemplary and one skilled in the art will recognize that other variations may be used in accordance with embodiments. Accordingly, variations and embodiments other than those discussed herein are possible.

Although embodiments of the invention are discussed primarily with reference to specific examples, any acceptable architecture, topology, protocols, network arrangement, forms of media, distribution arrangements, or other network and/or digital processing features can be employed. In general, network controllers, managers, access points, clients, and so on, can be implemented via any device with processing ability or other requisite functionality. It is also possible that functionality relevant to embodiments of the present invention can be included in a router, switch and/or other integrated device.

Although processes of the present invention, and the hardware executing the processes, may be characterized by language common to a discussion of the Internet (e.g., "client," "server," "peer") it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing or media presentation device can be used as a device suitable for a network connection as an endpoint. For example, portable computing devices such as a personal digital assistant (PDA), cell phone, laptop computer, or other devices can be employed. In general, the devices and manner of specific processing (including location and timing) are not critical to practicing important features of embodiments of the present invention.

Although embodiments of the present invention have been discussed primarily with respect to video conferencing associated with a network, such as the Internet, any suitable network, network topology, transmission protocols, sender-receiver devices and relationships, and other characteristics or properties of electronic devices, processes and transmission methods can be used. For example, features of the invention can be employed on various scales and in various applications, including local area networks (LANs), campus or corporate networks, home networks, etc.

Although the invention has been discussed with respect to specific embodiments thereof, these embodiments are merely illustrative, and not restrictive, of the invention. Embodiments of the present invention can operate between any two processes or entities including users, devices, functional systems or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data, may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
    determining a detection point, wherein the detection point is a pre-configured event that occurs during a conference, wherein the event is associated with at least one of an agenda item and a location in a document when displayed in the conference, and wherein the detection point includes at least one of reaching a resource capacity percentage, a floor control event occurring, and starting or stopping a video;
    registering one or more triggers to the detection point;
    during the conference, receiving the one or more triggers each time the detection point is reached, wherein each trigger has a predicate and an associated action, wherein the predicate is a conditional expression that is evaluated each time the detection point is reached, and wherein the action includes at least one of executing a security function, changing a policy of the conference, and executing a floor operation;
    evaluating the predicate of each of the one or more triggers when the detection point is reached; and
    executing one or more actions in response to a positive evaluation of one or more predicates, wherein executing the one or more actions result in a state change in the conference, wherein the above steps are performed by a processor.

2. The method of claim 1, wherein multiple triggers are set by tagging the detection point in a section of the document associated with the conference.

3. The method of claim 1, wherein the detection point is based on a state of the conference.

4. The method of claim 1, wherein the detection point is based on a state transition in the conference, wherein the state transition involves a change within contents of the conference.

5. The method of claim 1, wherein the detection point includes at least one of the following:
    displaying content;
    a participant joining or leaving the conference; and
    starting or stopping a recording of the conference.

6. The method of claim 1, wherein the detection point includes at least one of the following:
    time elapsing;
    starting or stopping the conference; and
    releasing a resource.

7. The method of claim 1, wherein the action includes at least one of the following:
    executing a script having a sequence of actions;
    dialing out to a prospective participant; and
    ejecting a participant.

8. The method of claim 1, wherein the action includes at least one of the following:
    sending a message via text messaging;
    sending a message via e-mail;
    locking or unlocking the conference; and
    controlling an enablement of an encryption.

9. A non-transitory computer readable storage medium on which is stored a sequence of instructions that, when executed by one or more processors, causes the processors to perform the method of:
    managing a workflow application in a conference, the conference having a plurality of events, the method comprising:
        determining a detection point, wherein the detection point is a pre-configured event that occurs during a conference, wherein the event is associated with at least one of an agenda item and a location in a document when displayed in the conference, and wherein the detection point includes at least one of reaching a resource capacity percentage, a floor control event occurring, and starting or stopping a video;
        registering one or more triggers to the detection point;
        during the conference, creating a-the one or more triggers each time the detection point is reached, wherein each trigger has a predicate and an associated action, wherein the predicate is a conditional expression that is evaluated each time a-the detection point is reached, and wherein the action includes at least one of executing a security function, changing a policy of the conference, and executing a floor operation;
        evaluating the predicate of each of the one or more triggers when the detection point reached, and
        executing one or more actions in response to the evaluating of one or more predicates, wherein executing the one or more actions result in a state change in the conference.

10. A computer-implemented rich media conferencing device configured to:
register a trigger against a detection point, wherein:
the trigger includes a predicate and an associated action, wherein the predicate is a conditional expression that is evaluated each time the detection point is reached, wherein a detection point is a pre-configured event in a conferencing system, wherein the event is associated with at least one of an agenda item and a location in a document when displayed in a conference, and wherein the trigger is registered by a conference participant;
the detection point is associated with at least one of a plurality of events, wherein the detection point evaluates multiple predicates of multiple triggers, wherein the detection point includes at least one of reaching a resource capacity percentage, a floor control event occurring, and starting or stopping a video, and wherein the action includes at least one of executing a security function, changing a policy of the conference, and executing a floor operation; and
one or more actions are configured to be executed in response to an encountering of the detection point during the conference and a positive evaluation of-one or more predicates, wherein an execution of the one or more actions result in a state change in the conference;
during the conference, receive one or more triggers each time the detection point is reached, wherein each of the triggers has a predicate and an associated action, wherein the predicate is a conditional expression that is evaluated each time the detection point is reached;
evaluate the predicate of each of the one or more triggers when the detection point reached; and
execute one or more actions in response to a positive evaluation of one or more predicates, wherein executing the one or more actions result in a state change in the conference, and wherein the computer-implemented reach media conferencing device is a hardware device.

11. The rich media conferencing device of claim 10, further comprising a controlling server.

12. The rich media conferencing device of claim 10, further comprising a user interface.

13. The rich media conferencing device of claim 10, wherein the detection point includes at least one of the following:
a display of content;
a recording start or stop; and
a participant joining or leaving the conference.

14. The rich media conferencing device of claim 13, wherein the content includes presentation materials.

15. The rich media conferencing device of claim 10, wherein the detection point includes at least one of the following:
an elapsed time;
a start or stop of the conference; and
a resource release.

16. The rich media conferencing device of claim 10, wherein the action includes at least one of the following:
execution of a script having a sequence of actions;
a dial-out to a prospective participant; and
ejection of a participant or a security function.

17. The rich media conferencing device of claim 10, wherein the action includes at least one of the following:
sending a message via e-mail;
locking or unlocking the conference; and
control of an enablement of an encryption.

18. A system comprising:
a processor;
a means for creating a trigger having a predicate and an associated action during a conference, wherein the predicate is a conditional expression that is evaluated each time a detection point is reached, wherein the detection point is an-a pre-configured event in a conferencing system, wherein the event is associated with at least one of an agenda item and a location in a document when displayed in the conference, and wherein the detection point includes at least one of reaching a resource capacity percentage, a floor control event occurring, and starting or stopping a video;
a means for registering the trigger to the detection point, wherein the trigger is registered by a conference participant;
a means for receiving one or more triggers each time the detection point is reached during the conference, wherein each of the triggers has a predicate and an associated action, wherein the predicate is a conditional expression that is evaluated each time the detection point is reached, and wherein the action includes at least one of executing a security function, changing a policy of the conference, and executing a floor operation;
a means for evaluating one or more predicates when the detection point reached, and
a means for executing one or more actions in response to the evaluating of one or more predicates, wherein executing the one or more actions result in a state change in the conference.

* * * * *